Aug. 12, 1941.   H. W. PRICE   2,252,136
CLUTCH OPERATING MECHANISM
Filed July 14, 1932   3 Sheets-Sheet 3
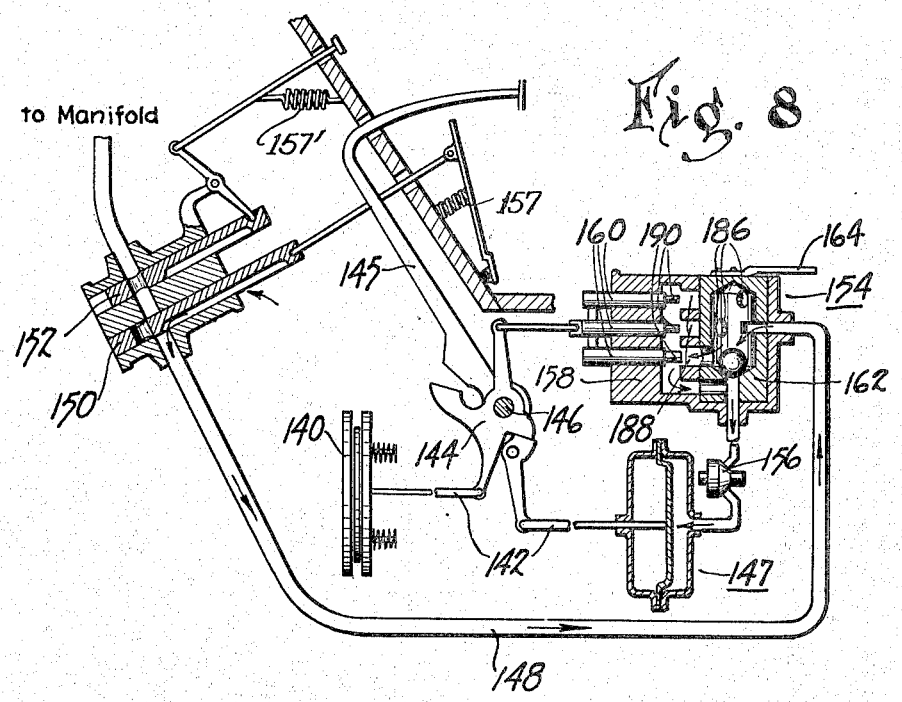
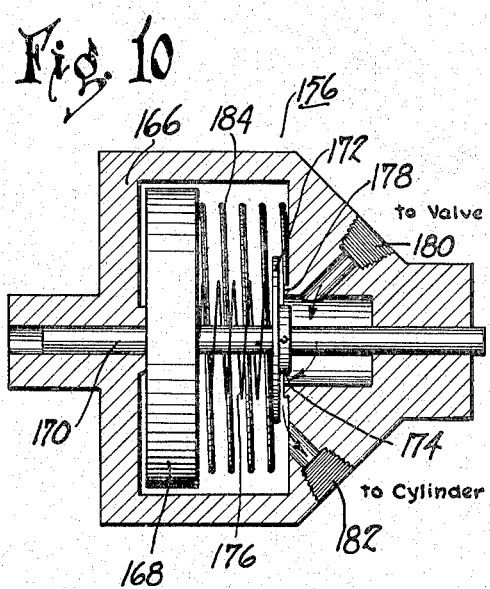
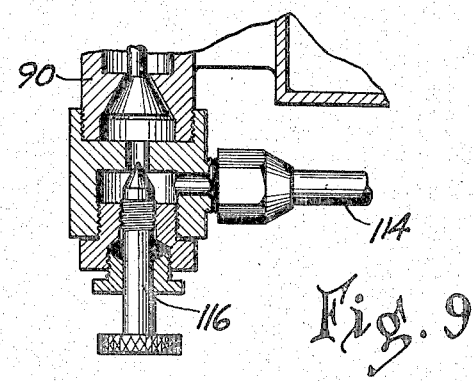
INVENTOR.
HAROLD W PRICE
BY H. O. Clayton
ATTORNEY.

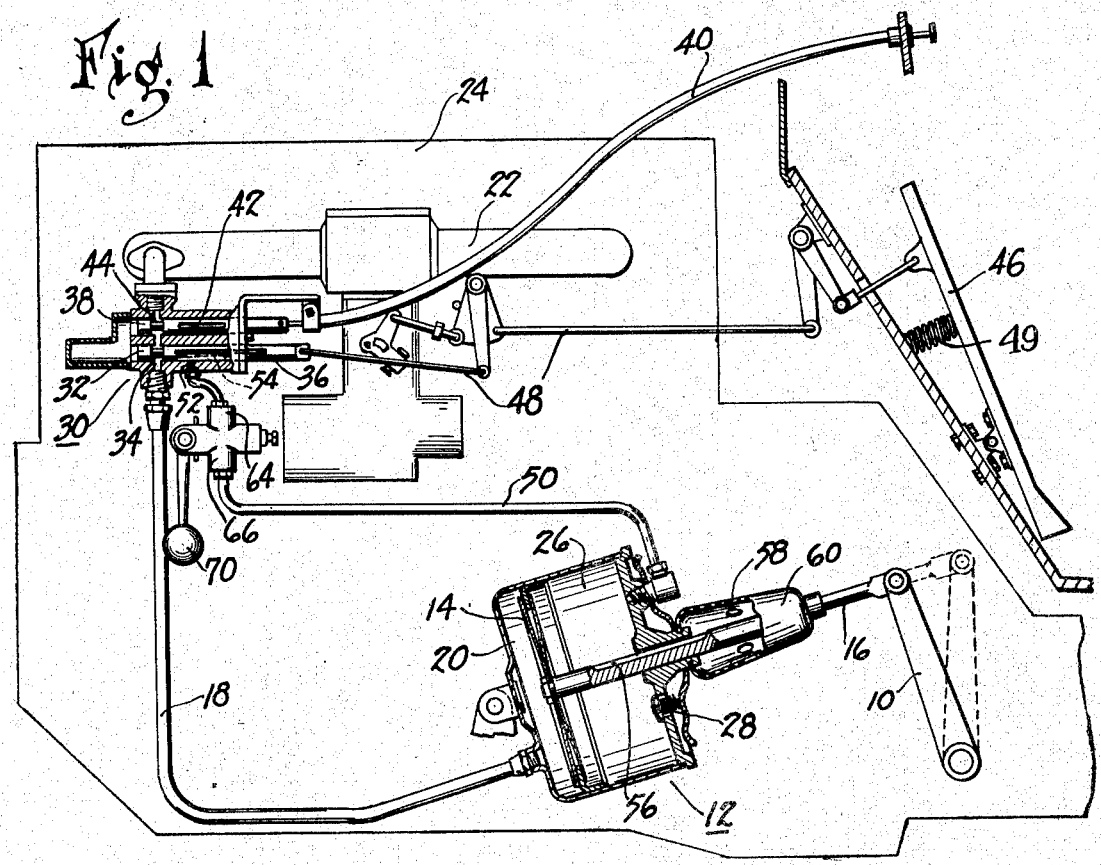

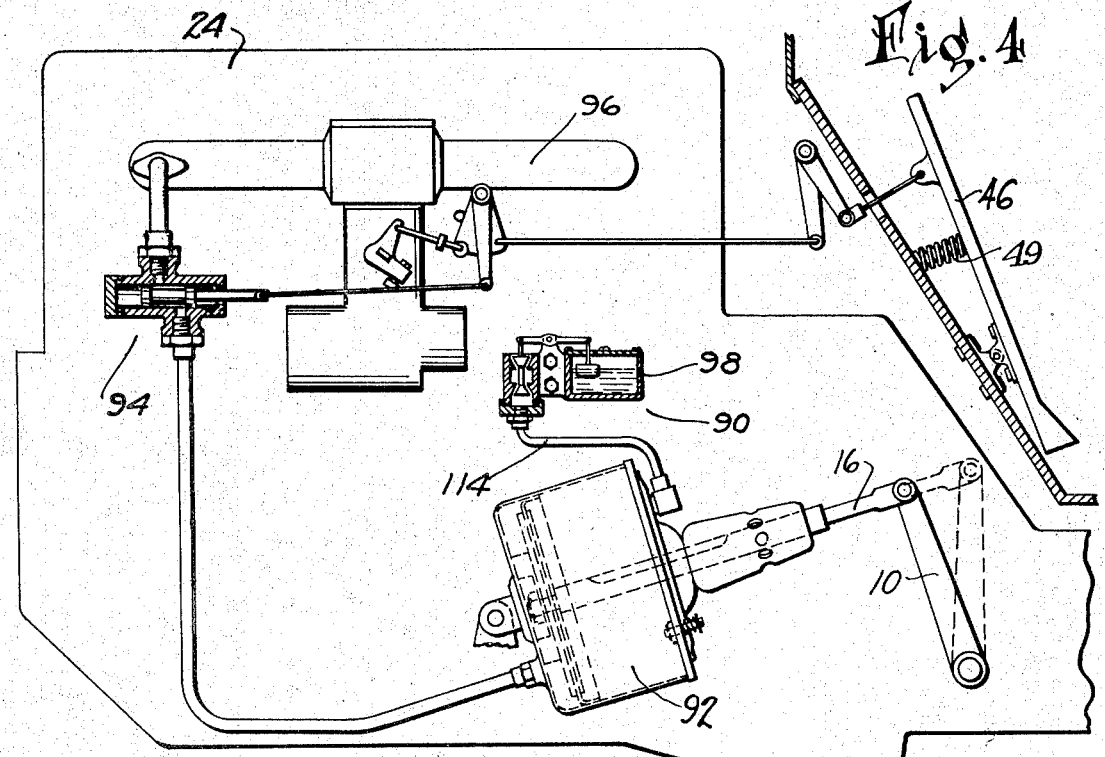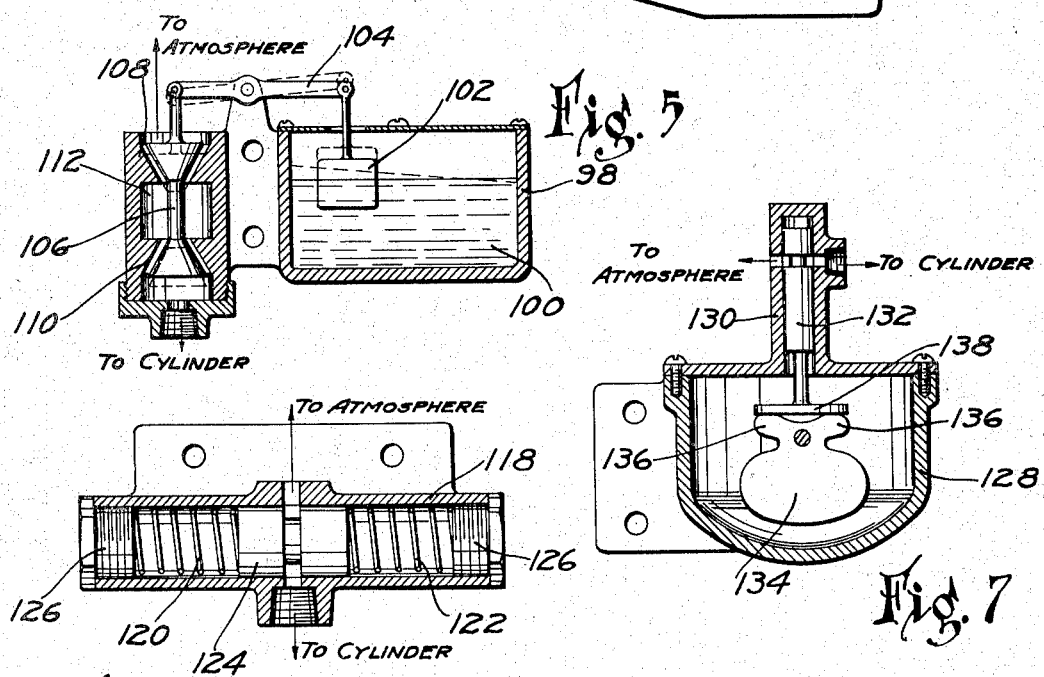

Patented Aug. 12, 1941

2,252,136

UNITED STATES PATENT OFFICE 2,252,136

CLUTCH OPERATING MECHANISM

Harold W. Price, South Bend, Ind., assignor to Bendix Aviation Corporation, South Bend, Ind., a corporation of Delaware Application July 14, 1932, Serial No. 622,513

24 Claims. (Cl. 192—.01)

This invention relates to means for controlling the operation of a vacuum operated clutch controlling mechanism of the type disclosed and described in the patent to Belcia, No. 1,470,272, dated October 9, 1923.

In the mechanism disclosed in the patent a three-way valve, operated by the accelerator of an automotive vehicle, serves to place the intake manifold of the internal-combustion engine of the vehicle in circuit with a suction motor, the latter being operably connected to the clutch mechanism. The motor is thus evacuated by virtue of the evacuated condition of the manifold and the clutch is disengaged. With operation of the accelerator to speed up the engine the control valve is operated to vent the clutch motor, thus permitting an engagement of the clutch under the action of the conventional clutch spring.

The patented structure, however, makes no provision for controlling the engagement of the clutch to simulate the conventional manual control in the absence of power.

The present invention is accordingly directed to the provision of means for controlling the engagement of the clutch, the gaseous pressure of the motor being automatically regulated to determine the mode of clutch engagement. Means may be provided to control the pressure of the single-ended motor as disclosed in the aforementioned Belcia patent, and there is also suggested the provision of means for controlling the pressure within the compression end of a double-ended suction motor.

Relative to the double-ended type of clutch operating motor, a feature of the invention lies in the provision of an accelerator controlled bleed valve for manually regulating the efflux of air from the compression end of the motor, said bleed valve cooperating with an inertia operated governor valve incorporated in a fluid transmitting connection between the motor and the bleed valves, said governor valve functioning to limit the possible acceleration of the vehicle to a predetermined maximum during the engagement of the clutch.

The invention in its broadest aspect, however, relates to the provision of governor means functioning to limit the possible rate of change of acceleration or deceleration of the vehicle, under the action of the engaging clutch, to a predetermined maximum.

The suggested governor means serves the useful function of obviating any objectionable jerking action or excessive acceleration of the vehicle, both during the starting of the vehicle and during the subsequent engaging operations of the clutch after the vehicle is placed in motion.

Still another feature of the invention lies in the provision of a governor valve, as above described, which is operative, in engaging the clutch, irrespective of the desired direction of movement of the vehicle, that is either forward or backward.

A further object of the invention is to provide a clutch operating motor which will permit the driving clutch plate to move very rapidly during the first part of its throw, or until the clutch plates are about to engage, and then to very slowly permit the plates to engage, the latter movement being regulated by the aforementioned inertia controlled governor means.

Yet another object of the invention is to provide a very effective inertia operated governor means, and to this end there is suggested the provision of a mass, subject to movement by changes in speed of the vehicle, said mass being normally maintained, by either gravity or by yielding means, in a predetermined position to maintain the control valve in an inoperative position, and said mass being rendered operative, by change of vehicular speed, to maintain the control valve in an operative position to thereby predetermine the rate of change of speed of the vehicle.

Other objects of the invention and desirable details of construction, including various types of governor mechanisms, and combinations of parts will become apparent from the following detail description of certain preferred embodiments of the invention taken in conjunction with the accompanying drawings, in which:

Figure 1 is a diagrammatic view disclosing the general arrangement of the several elements of the clutch control mechanism constituting one embodiment of the invention;

Figure 2 is a view, partly in section and partly in elevation, disclosing one form of governor valve, said valve constituting the essence of the invention;

Figure 3 is a plan view of the valve of Figure 2;

Figure 4 is a view, similar to Figure 1, disclosing another arrangement of the various elements going to make up the clutch control mechanism;

Figure 5 discloses, in detail, the governor controlled valve mechanism of Figure 4;

Figures 6 and 7 disclose modified forms of governor mechanisms;

Figure 8 is a view, similar to Figures 1 and 4, disclosing yet another arrangement of the parts;

Figure 9 discloses a slightly modified form of the invention of Figure 4; and

Figure 10 discloses, in section, the governor valve mechanism of Figure 8.

There is disclosed in Figure 1 a preferred embodiment of the invention as applied to an automotive vehicle of conventional design wherein a clutch operating crank 10 is adapted to be actuated by a vacuum operated double-ended fluid motor 12, a reciprocable piston 14 of which is operably connected with the crank by means of a connecting rod 16.

A fluid transmitting flexible conduit 18 interconnects the left or suction compartment 20 of the double-ended motor with the intake manifold 22 of an internal-combustion engine 24.

At closed throttle a vacuum of some twenty inches of mercury is induced in the manifold by virtue of the pumping action of the engine pistons, and with the manifold placed in circuit with the motor the suction compartment 20 of the latter is thereby evacuated to effect a disengagement of the clutch. Air at atmospheric pressure enters the right or compression compartment 26 of the clutch motor via a check valve 28, said valve being rendered operative as the piston 14 is moved to the left to disengage the clutch.

A combined control, cut-out and bleed valve unit is indicated at 30, Figure 1, the control valve portion of the unit serving to either place the manifold in circuit with the motor to disengage the clutch, as described above, or to place the suction or left compartment 20 of the motor in circuit with the atmosphere to effect an engagement of the clutch. The control valve portion of the valve unit comprises a plunger 32 recessed at 34 to connect the manifold with the motor when the accelerator is released, said plunger being slotted at 36 to vent the motor to the atmosphere to effect an engagement of the clutch when the accelerator is depressed. The casing of the valve unit is provided with an atmospheric port, not shown, to register with the atmospheric slot 36.

The cut-out element of the valve unit comprises a plunger 38, operable from the dash of the vehicle by a Bowden control 40, said plunger being slotted at 42 to vent the motor to the atmosphere, via an opening in the casing, not shown, and recessed at 44 to maintain the connection between the manifold and motor. When it is desired to cut out the power mechanism for operating the clutch, the cut-out valve plunger is moved to the left, Figure 1, to vent the motor and cut off the connection with the manifold.

The valve unit 30 is not described in particular detail herein, inasmuch as the same forms no part of the instant invention, being the invention of Victor W. Kliesrath, described in application No. 592,170, filed February 10, 1932, now Patent No. 2,092,256 issued Sept. 7, 1937.

The control valve plunger 32 is operably connected to a throttle controlling accelerator pedal 46 by suitable linkage 48, the connection being such that with release of the accelerator, under the action of a return spring 49, the clutch is disengaged and with actuation of the accelerator, to speed up the engine, the clutch is engaged. These features are also brought out in greater detail in the aforementioned application and are not particularly described herein.

The invention is particularly directed to means for controlling the engaging operation of the clutch motor. In the embodiments of the invention which are selected for illustration, there is disclosed in Fig. 1 a conduit 50 interconnecting the compression compartment 26 of the motor with a port 52 in the valve unit 30, said port adapted to register with a tapered slot 54 in the barrel of the control valve plunger 32. The casing of the valve unit is also provided with an atmospheric port, not shown, whereby the air forced out of the compression compartment of the motor during the engagement of the clutch passes through the conduit 50 and thence into the tapered slot 54 and out through the port in the casing.

Referring now to the operation of the mechanism thus far described, with release of the accelerator to idle the engine the suction compartment 20 of the clutch motor is placed in communication with the manifold to thus effect a disengagement of the clutch. When it is desired to speed up the engine and engage the clutch the accelerator is depressed, thus venting the suction compartment and permitting the conventional clutch spring, not shown, to reengage the driving and driven plates of the conventional clutch, not shown. The mode of movement of the driving clutch plate may be determined by suitably controlling the efflux of air from the compression compartment of the clutch motor, and it is to this end that the invention is directed.

As described above, the air forced from the clutch motor passes through the bleed valve; therefore, the driving clutch plate moves at a rate dependent upon the degree of depression of the accelerator, said depression determining the degree of taper of slot 54, which is exposed to the vent port in the casing. The connecting rod 16 is also provided with a slot 56 interconnecting the compression compartment 26 with the atmosphere via ports 58 in a protector boot 60. Slot 56, together with the bleed valve, provides means for a rapid dump of air from the motor to thereby effect a rapid movement of the driving clutch plate up to the point to which the clutch plates are about to engage, the length of the slot being regulated to be covered by the end wall of the motor to obtain this result. The remaining movement of the clutch plate is controlled solely by the efflux of air via the bleed valve, this movement being relatively slow to effect the desired smooth engagement of the clutch.

It often happens, however, that the driver, particularly in starting the vehicle, inadvertently opens the throttle too wide by an excessive operation of the accelerator pedal. With the mechanism described this results in a relatively rapid last stage of movement of the clutch plate with the consequent excessive acceleration of the vehicle. This familiar jerking action in starting the car is certainly objectionable to the passengers, and is also harmful to the entire mechanism of the vehicle.

In order to obviate this result and render the operation of the clutch fool-proof, so to speak, there is suggested the incorporation of an acceleration and deceleration limiting governor valve mechanism in the fluid transmitting connection between the motor and the bleed valve.

Such a valve is disclosed in detail in Figures 2 and 3 wherein a casing 62, rigidly secured to the chassis, is provided with ports 64 and 66, the former interconnecting the governor valve with the bleed valve and the latter port interconnecting the governor valve with the clutch motor. The valve casing is provided at one end with spaced projections 68 providing bearings, at their ends, for a pivotally mounted ball pendulum member 70, the latter provided with bosses 72 and 74 adapted to contact a pressure plate 76 secured to one end of a reciprocable valve plunger member 78. The plunger 78 is provided with a recess 80 adapted to register with the ports 64 and 66. A spring member 82 is interposed between one end of the plunger and a stamping 84, the state of compression of the spring being determined by the position of a manually adjustable screw 86. The valve casing is also provided with an opening 88, said opening, together with an opening 90 in the stamping, not shown, permitting freedom of movement of the plunger 78.

Describing the operation of the governor valve, the pendulum, under the action of gravity and the spring 82, and with the vehicle at rest or in uniform motion in a straight line, permits the plunger 78 to so position itself as to register the recess 80 with the ports 64 and 66, thus maintaining the bleed circuit open. When the vehicle is to be placed in motion with the transmission in low gear, the accelerator is depressed to first vent the suction compartment of the clutch motor by the aforementioned operation of the control valve plunger 32 and then open the throttle to accelerate the internal-combustion engine.

After the suction compartment of the motor is vented to the atmosphere the clutch spring functions to move the driving clutch plate into engagement with the driven plate, the mode of movement of the plate being determined by the manner in which the air is forced out of the compression compartment 26 of the motor. As heretofore described, the first stage of movement of the clutch plate is relatively rapid due to the additive effect of the air efflux from the slot 56 and bleed valve, the degree of bleed being determined by the degree of depression of the accelerator pedal. After the efflux of air via the slotted rod is cut off, the movement of the clutch plate is relatively slow, inasmuch as the bleed valve constitutes the only means of venting the air.

It often happens, however, that the driver, particularly the inexperienced driver, has opened the throttle too wide, resulting, with the governor valve omitted from the present mechanism, in an undesired rate of increase of acceleration of the vehicle, by virtue of the progressively increasing clutch spring load upon the driving clutch plate.

The acceleration governor valve, when incorporated with the mechanism, obviates this effect, the valve being adjusted to limit the possible acceleration of the vehicle during the engagement of the clutch and before the clutch plates rotate as a unit, to a predetermined maximum, depending upon the adjustment of loading of the valve spring 82. This maximum is considerably below the acceleration factor which would prove objectionable to the passengers of the vehicle; therefore, with the suggested mechanism the operation of the clutch is effective to provide a desirable start of the vehicle.

Explaining the theory of operation of the governor mechanism: when sufficient air has been exhausted from the compression end of the motor to load the clutch plate, to impart a predetermined acceleration to the vehicle, the pendulum, by virtue of its inertia, is actuated to compress the spring 82 moving the plunger 78 to cut off communication between the motor and the bleed valve. The remaining air in the compression end of the motor is thus trapped and the torque delivered from the engine through the driving clutch plate to the driven plate to accelerate the vehicle is limited to its then existing value. As indicated above, this acceleration is considerably lower than that which would be felt by the passengers, the sensitive pendulum swinging to close the governor valve very shortly after the car is placed in motion. Obviously, the limiting acceleration may be increased or diminished by the adjustment of the spring loading screw 86. It is to be particularly noted that the governor valve is operative irrespective of the direction of motion of the vehicle, for either one of the dotted line operative positions of the pendulum, as shown in Figure 2, serves, through one or the other of the bosses 72 and 74, to move the plunger member to the right to cut off the bleed valve.

After the speed of the vehicle has been increased to the desired degree, the operator releases the accelerator preparatory to shifting the gears, thereby automatically again disengaging the clutch by means of the control valve, and when the movement of the vehicle becomes uniform, that is when the speed is constant, the pendulum is returned by gravity to the full line position of Figure 2 to make possible a repetition of the aforementioned cycle of operations. The check valve 28 insures a movement of the piston 14 to the clutch disengaged position.

The operator now places the transmission in intermediate gear, and the accelerator is again depressed to further increase the speed of the vehicle. The aforementioned operation of the clutch is then repeated, the clutch spring load being automatically limited to effect the desired limiting acceleration. The operation is again repeated in placing the vehicle in high gear: in fact, the mechanism is possible of operation whenever the vehicle is either accelerated or decelerated, for the governor is operative only when the pendulum is swung, and the swinging of the pendulum is only possible with a progressive change in vehicular speed. With the vehicle coasting in high gear, which is commonly known as "free wheeling," the device is inoperative to impede a rapid clutch engagement, inasmuch as the vehicular movement is usually of a substantially definite speed, there being little or no rate of change of speed, and the only object in depressing the accelerator is to increase the R. P. M. of the driving clutch plate to equal that of the driven plate to thereby maintain the given speed of the vehicle.

The governor is operative with progressive change in velocity, that is either acceleration or deceleration; therefore, in free wheeling or coasting should the driver fail to rev the motor sufficiently, causing the vehicle to pick up the engine as a brake, the car will be decelerated and the governor is then operative to limit said deceleration to a limit which will not inconvenience the passengers.

With the governor mechanism of the present invention there may result an increase of clutch slipping, particularly in starting the vehicle. However, this disadvantage is more than offset by the advantages of providing a fool-proof clutch engaging operation. With the suggested mechanism the heretofore demanded nicety of adjustment of the clutch plate contacting point, that is the covering of the slot 56, is obviated, for the mechanism is automatically operative to limit the torque delivered to the driven plate when there is relative movement between the driving and driven plates.

In actual practice it has been found that the governor may be adjusted to be operative only in starting the vehicle, the desired acceleration at this time being higher than the desired acceleration during the subsequent gear shifting operations. However, the mechanism by virtue of its presence will obviate the results of a careless operation of the clutch at all times during the operation of the vehicle.

If desired, the governor valve spring 82, Figure 2, may be so loaded that the valve does not completely cut off the bleed; in which event the clutch spring will be progressively released and the rate of change of acceleration of the vehicle limited to a predetermined maximum. Here again the adjustment may be such as to obviate an undesired maximum acceleration to be felt by the passenger, and the adjustment should be such that the desired car speed in low gear, or any other gear, will be reached before the acceleration becomes objectionable.

There is disclosed in Figure 4 a modified embodiment of the invention wherein the cut-out valve and the accelerator controlled bleed valve are dispensed with, the entire bleed of the motor being controlled by an inertia operated governor valve mechanism 90.

There is disclosed in Figure 4 a clutch operating motor 92 similar in every detail to the motor of Figure 1. A control valve 94 serves to alternately place the motor in circuit with the manifold 96 and the atmosphere to disengage and engage the clutch, as previously described in connection with the mechanism of Figure 1.

The governor mechanism is detailed in Figure 5, the same comprising a container 98, preferably filled with a fluid such as liquid mercury 100, or its equivalent, the latter having suspended therein a float 102 connected by a lever 104 with a spool-shaped valve member 106. The frustum-shaped ends of the valve are adapted to register with complementary valve seats 108 and 110, the latter providing ports connecting a recess 112, in the valve body, with the atmosphere and with the clutch motor, respectively.

In operation, air is passed from the motor via a conduit 114 and the port 108 as the clutch is engaged. When the gaseous pressure within the compression end of the motor reaches a given factor, resulting in a given clutch spring load, there results a determined acceleration of the vehicle. If this acceleration factor is of a degree to move the inertia fluid 100, the float is automatically moved to actuate the lever 104 and close the valve. This action is effected irrespective of whether the vehicle is accelerating or decelerating, as is evident from the details of the mechanism of Figure 5.

The air in the compression end of the clutch motor is thus trapped to limit the rate of change of velocity to the then existing factor, and the operation of the mechanism is otherwise similar to that of Figure 1.

The opening between the valve and its seat 108 is made sufficiently small to limit the rate of engagement of the clutch so that the governor will function to cut off the bleed before the clutch plate has been excessively loaded. This is necessary due to the lag in operation of the governor, due to friction of the parts and lost motion.

If desired, the bleed may be manually adjustable by means of needle valve 116, as disclosed in Figure 9, and this valve may be incorporated in the connection between the governor valve 90 and the conduit 114 of the arrangement disclosed in Figure 4.

There are disclosed in Figures 6 and 7 alternative types of inertia operated governor mechanisms. Describing the mechanism of Figure 6, a casing 118 houses at each of its ends springs 120 and 122 suspending between them a recessed inertia operated plunger 124, the latter adapted either to maintain the clutch motor in circuit with the atmosphere or to cut off said atmospheric connection with excessive change of vehicular speed in a manner previously described. Plugs 126 serve to adjust the position of the parts as desired.

In Figure 7 there is disclosed a casing 128 having a hollow projection 130, the latter housing a reciprocable recessed plunger 132 actuated by an irregularly shaped inertia operating bob member 134. The bob 134 is provided with projections 136 adapted to actuate a pressure plate 138 connected to the plunger, irrespective of whether the vehicle is accelerating or decelerating.

As is obvious from an inspection of the drawings, when the bob 134 is actuated, due to the excessive rate of change of speed, the plunger 132 moves upwardly to cut off the atmospheric vent of the clutch motor, thus maintaining the existing acceleration or deceleration, as the case may be.

There is disclosed in Figure 8 yet another combination of elements utilizing the governor controlled valve for determining the maximum acceleration. Similar to the arrangements previously described a conventional clutch 140 is arranged to be actuated by linkage 142, said linkage including a crank 144 keyed to a clutch shaft 146. A conventional manually operable clutch pedal 145, having an overrunning connection with the crank 144, may also be provided to insure an operation of the clutch when the power mechanism is inoperative. A clutch operating fluid motor 147 is connected to the engine manifold by conduit 148, an accelerator operated three-way control valve 150, a foot operated cut-out three-way valve 152, a bleed valve 154, and a governor valve 156 being incorporated in the circuit provided by the conduit. The valve 150 is biased, by a return spring 157, to a position to interconnect the manifold and bleed valve 154, and the valve 152 is biased, by a return spring 157', to a position to vent the line 148 to atmosphere. The specific details of the arrangement of Figure 8, including the details of the three-way and bleed valves, form no part of the present invention: consequently, the description herein given is of a very general character, and is largely limited to describing the relationship of the governor valve in the combination, the latter constituting the essence of the instant invention.

Briefly, the bleed valve 154 comprises a casing 158, housing reciprocable plungers 160 operated by the clutch operating crank 144, and a rotatable barrel valve 162 operated by the gear shift lever of the vehicle by a crank 164.

The governor valve disclosed in detail in Figure 10 comprises a casing 166, housing an inertia mass 168 rigidly mounted on a reciprocable support rod 170 journaled in the ends of the casing 166. A disk valve member 172 is slidingly mounted on the rod 170 and is forced into abutment with a stop 174 on the rod by a spring 176. The valve member 172 is adapted to seat upon a land or valve seat 178 to thereby cut off normal fluid transmitting communication between the bleed valve and clutch motor via ports 180 and 182 in the casing 166. A return spring 184 is interposed between the mass 168 and the inside wall of the casing to maintain the inertia mass and the valve 172 in their inoperative positions.

Describing now the operation of the mechanism of Figures 8 and 10, operation of the three-way 150 to place the clutch motor in circuit with the manifold serves to disengage the clutch, and subsequent operation of the three-way valve 150 to vent the motor serves to initiate the engagement of the clutch. The mechanism of Figure 8 discloses the clutch as the same is being engaged, the air returning to the suction side of the motor being indicated by the arrows.

The rate of influx of air to the motor is determined by the bleed valve 154, the position of the plungers 160 determining the rapid first stage of clutch plate movement, and the selection of the gear ratio to actuate the barrel valve 162 determining the rate of bleed during the last or clutch engaging stage of movement. The barrel 162 is provided with openings 186, one of said openings registering with one of three openings 188 in the casing to selectively determine the path of air flow through the bleed valve. The mode of air flow is determined by stems 190 on the ends of plungers 160, said stems each being of different size and serving to obstruct the openings 188. The rate of flow, and thus the rate of movement of the driving clutch plate or the rate of increase of clutch plate load, is accordingly determined by the setting of the transmission. With the transmission in low gear or reverse gear, the lowermost of the plungers disclosed in the figure serves to obstruct the air flow, the large end stem 190 of the same materially impeding the air flow to the clutch motor. The clutch, with the transmission in low or reverse gear, is thus engaged slowly as is desired. In second and high gears the intermediate and upper stems come into play respectively to effect a progressively increasing rate of clutch engagement.

The governor operated cut off valve 156 in the aforementioned hook-up functions in a manner similar to the previously described governor mechanisms. When, for any one of many reasons, the acceleration exceeds the limiting acceleration the governor automatically comes into play to cut off the bleed line, thus holding the clutch parts static, and the clutch plates are applied with the then existing clutch spring load. The inertia mass 168 is moved to the right compressing springs 176 and 184 to seat the valve member 172 and cut off or isolate the motor from the bleed valve. When the forward speed of the vehicle becomes uniform the mass 168 is returned to its inoperative position by the spring 184, thus releasing the valve spring 176 and permitting the valve to unseat. The flow of air into the motor is thus resumed and the clutch fully engaged.

By placing the governor valve immediately adjacent the clutch motor any undesirable surge of air in the conduit is obviated, for the distance between the governor and the motor is relatively small. The clutch motor thus quickly responds to the governor operation, the movement of the driving clutch plate being stopped almost instantly.

With the governor incorporated in the mechanism of Figure 8, it is practical for the driver to start the vehicle in second gear, for under all conditions of operation of the bleed valve the acceleration is limited to the desired maximum. Manufacturing tolerance in the size of the openings 186 and 188, the size of the stems 190 and the size and proportion of the remaining parts may thus be increased without seriously affecting the efficiency of the mechanism.

There is thus provided, in the several arrangements heretofore described, an efficient automatic clutch control mechanism, the inertia governor operated valve intimately cooperating with the remainder of the mechanism to provide a uniformly effective operation of the clutch under all conditions of service.

While several illustrative embodiments have been described, it is not my intention to limit the scope of the invention to such particular embodiments, or otherwise than by the terms of the appended claims.

I claim:

1. In a power operated clutch operating mechanism for an automotive vehicle provided with a clutch, power operated means controllable to effect a disengagement of the clutch and an engagement of the clutch, and means cooperating with said power means and operative to limit the rate of change of speed of the vehicle, under the action of its clutch, to a predetermined maximum.

2. In a power operated clutch operating mechanism for an automotive vehicle provided with a chassis and a clutch, power operated means controllable to effect a disengagement of the clutch and an engagement of the clutch, and means cooperating with said power means and operative to limit the acceleration of the vehicle, under the action of its clutch, to a predetermined maximum, said latter means including a casing rigidly connected to the chassis of the vehicle, a movable bleed valve member housed within said casing and further including a movable part operative by virtue of its inertia to actuate said valve member and thereby render said means operable.

3. An automotive vehicle having a clutch, means for controlling the engagement of the clutch, and inertia controlled means for limiting the engagement of the clutch and thereby limiting the rate of change of speed of the vehicle to a predetermined maximum.

4. An automotive vehicle provided with a clutch, means for controlling the engaging operation of the clutch, and means for limiting the operation of said first mentioned means according to the acceleration of the vehicle.

5. An automotive vehicle provided with a clutch and an internal-combustion engine, pressure differential operated means for controlling the disengagement and engagement of the clutch, and governor means cooperating with said pressure differential operated means and operative according to the rate of change of speed of the vehicle for controlling the clutch engaging operation of said pressure differential operated means.

6. An automotive vehicle provided with a clutch and an internal-combustion engine, a fluid motor in fluid transmitting connection with the engine and operable, by the vacuum inductive capacity of the engine, to disengage the clutch, a control valve for said motor, throttle controlling means for operating said control valve, means also operable by the throttle controlling means for controlling the clutch engaging operation of said motor, and governor means cooperating with said clutch engaging control means and operable to limit the operation of said control means according to the acceleration of the vehicle.

7. In an automotive vehicle provided with a clutch, a double-ended vacuum operated motor for controlling the operation of the clutch, means for controlling the gaseous pressure of one end of the motor to effect a disengagement of the clutch and permitting engagement of the clutch, means for controlling the gaseous pressure of the other end of the motor to determine the mode of clutch engaging operation of the motor, and governor means automatically operative, in response to the acceleration of the vehicle at a predetermined rate, to so actuate the second mentioned means as to maintain the then existing gaseous pressure within the second mentioned end of the motor.

8. In an automotive vehicle provided with a clutch, having yieldable means for maintaining the same in engagement, fluid controlled means operably connected to said clutch, and means automatically operable to limit the pressure of said fluid to thereby limit the action of said yieldable means in applying the clutch.

9. In an automotive vehicle provided with a clutch, having yieldable means for maintaining the same in engagement, fluid controlled means operably connected to said clutch, and means automatically operable to limit the pressure of said fluid to thereby limit the action of said yieldable means in applying the clutch, said automatically operable means comprising a governor valve operable according to the acceleration of the vehicle.

10. An automotive vehicle comprising an internal-combustion engine and a clutch, engine operated vacuum power means for operating the clutch, a clutch engaging bleed valve for said power means, a throttle for said engine, means for simultaneously operating the throttle and bleed valve, and governor means cooperating with said bleed valve to determine the mode of operation of said power means in its clutch engaging operation, said governor means comprising a pendulum operated valve operable according to the rate of change of velocity of the vehicle.

11. An automotive vehicle comprising a clutch, an internal-combustion engine, a double-ended fluid motor, means interconnecting said engine and one end of said said clutch motor, a control valve interposed in said connecting means, a bleed valve, means interconnecting the other end of said motor with said bleed valve, and an inertia operated acceleration governor valve interposed in said last mentioned connection to control the engagement of the clutch.

12. An automotive vehicle comprising a clutch, gaseous fluid operated means for disengaging the clutch and for permitting a reengagement of the clutch, and means for limiting the pressure of the fluid within said clutch operating means to a predetermined maximum during the clutch engaging operation thereof, said limiting means comprising a cut-off valve and an inertia operated governor means for rendering said cut-off valve operative.

13. In an automotive vehicle provided with a clutch, a fluid motor for controlling the operation of the clutch, valve means for controlling the efflux of fluid from said motor during the clutch engaging operation of the motor, and means for controlling the operation of said valve, said latter means comprising a mass subject to movement depending upon the rate of change of speed of the vehicle, said mass being normally maintained by gravity in a predetermined position to render the valve inoperative, and said mass being operative with a predetermined rate of change of speed of the vehicle to render said valve operative to cut off the efflux of power fluid from said motor.

14. A governor controlled valve means for an automatic clutch control of an automotive vehicle comprising a ported valve casing member, a reciprocable spring loaded valve member housed within said casing, said valve member being provided with a recess adapted to register with the ports in the valve casing, and an inertia operated pendulum means operably connected to said valve member for actuating the same, when and if the rate of change of velocity of the vehicle exceeds a predetermined maximum.

15. A governor operated valve device for an automotive clutch control mechanism comprising a container, a fluid housed within said container, a float member supported by said fluid, a valve member secured to said container, and lever means interconnecting said valve and float.

16. In a clutch control system for motor vehicles, a fluid pressure operated unit for operating the clutch from the manifold, a manually operated valve for controlling the power unit and an inertia valve responsive to acceleration and deceleration which normally maintains the manual valve in communication with the power unit.

17. In an automotive vehicle comprising an internal combustion engine and a clutch, a vacuum operated clutch power unit, an accelerator operated three-way control valve and a cut-off valve for controlling the operation of said unit, and inertia means for controlling the operation of the cut-off valve.

18. In a vacuum operated clutch mechanism for an automotive vehicle, a vacuum operated clutch power unit, an accelerator operated control valve for the power unit and an inertia operated cut-off valve for controlling the flow of air from the power unit.

19. A vacuum operated clutch controlling mechanism for an automotive vehicle comprising a double ended vacuum operated motor, a control valve for controlling the flow of air into and from one end of the motor and an inertia operated valve for controlling the flow of air from the other end of the motor.

20. In a vacuum operated clutch mechanism for an automotive vehicle provided with an accelerator, a vacuum operated double ended clutch power unit and means for controlling the operation of said unit including an accelerator operated bleed valve, a cut-off valve for controlling the flow of air from one end of the unit to the bleed valve and an inertia operated means for controlling the operation of said cut-off valve.

21. A vacuum operated clutch controlling mechanism for an automotive vehicle comprising a vacuum operated motor and means for controlling the operation of said motor including an accelerator operated valve and a pendulum operated valve for controlling the flow of air from one end of the motor during the clutch engaging operation thereof.

22. In a vacuum operated clutch operating mechanism for an automotive vehicle, a vacuum operated motor, and means for controlling the operation of said motor including a combined three-way and bleed control valve and inertia operated means, automatically operative in response to the acceleration of the vehicle at a predetermined rate, for in part controlling the operation of said motor.

23. In a vacuum operated clutch mechanism for an automotive vehicle, a vacuum operated clutch power unit, a manually operated three-way control valve for the power unit, and inertia means operative in accordance with the acceleration of the vehicle for controlling the operation of the power unit.

24. A automotive vehicle comprising a clutch having driving and driven plates, power means for disengaging said plates and controlling the reengagement thereof said means including means automatically rendered operative, at a predetermined acceleration of the vehicle, to maintain said plates in contact with each other at a fixed load.

HAROLD W. PRICE.